United States Patent [19]
Elkins et al.

[11] 3,866,734
[45] Feb. 18, 1975

[54] DOUBLE CHECK VALVE BETWEEN SEPARABLE INFLATABLE UNITS

[75] Inventors: Paul A. Elkins, Palos Verdes Peninsula, Calif.; Ralph A. Miller, New Monmouth, N.J.; Lawrence E. Scheer, Phoenix, Ariz.

[73] Assignee: The Garrett Corporation, Los Angeles, Calif.

[22] Filed: Aug. 15, 1973

[21] Appl. No.: 388,708

[52] U.S. Cl. ............... 193/25 B, 137/572, 137/512, 137/515.5, 137/614.05, 244/137 P, 244/DIG. 2
[51] Int. Cl. ............................................. A62b 1/20
[58] Field of Search ....... 244/DIG. 2, 137 R, 137 P; 193/25 R, 25 C, 25 B; 9/11 R; 137/572, 512, 515.5, 614, 614.01, 614.02, 614.05, 614.06, 231, 614.03, 614.04; 285/33

[56] References Cited
UNITED STATES PATENTS

| | | | |
|---|---|---|---|
| 2,492,271 | 12/1949 | Cox et al. | 137/614.03 |
| 2,789,838 | 4/1957 | Palm | 137/614.05 |
| 3,035,797 | 5/1962 | Neuschotz | 137/572 X |
| 3,538,946 | 11/1970 | Hilsheimel | 137/515.5 X |
| 3,679,025 | 7/1972 | Rummel | 182/48 X |
| 3,692,144 | 9/1972 | Summel | 193/25 B X |
| 3,712,336 | 1/1973 | Bell | 137/614.04 X |
| 3,712,417 | 1/1973 | Chacko | 193/25 B X |

*Primary Examiner*—William R. Cline
*Attorney, Agent, or Firm*—Albert J. Miller

[57] ABSTRACT

A double check valve for use between two separable inflatable units such as an inflatable ramp disposed at an elevated egress and an inflatable evacuation slide and raft extending from the inflatable ramp to a surface below the elevated egress. Each inflatable unit includes a check valve to prevent deflation of either of the two units when they are separated. The check valve for one inflatable unit includes means to maintain the other check valve in an open position when the check valves are operably connected.

14 Claims, 8 Drawing Figures

DOUBLE CHECK VALVE BETWEEN SEPARABLE INFLATABLE UNITS

BACKGROUND OF THE INVENTION

For some time there has been a requirement that all passenger carrying aircraft be equipped with inflatable escape slides at the aircraft exits to provide means for rapidly evacuating passengers from the aircraft in the event of an emergency. While these inflatable escape slides have taken many forms, they generally comprise an inflatable structural beam support over which there is disposed a slide surface upon which the passengers may safely slide to the ground from the aircraft. The slides are normally attached to the aircraft at their upper end by a girt and girt bar arrangement and a supply of compressed gas is provided to inflate the beam structure.

With the development of larger aircraft capable of carrying considerably more passengers than before, it has become necessary to provide inflatable escape slides for the aircraft exits which open out over the aircraft wings. An example of inflatable apparatus for use from an aircraft exit over a wing is disclosed in U.S. Pat. No. 3,692,144.

At the same time it has become apparent that it is highly desirable to be able to utilize an inflatable escape slide as an inflatable life raft in the event of an emergency ditching of the aircraft in a body of water. U.S. Pat. Nos. 3,679,025 and 3,712,417 are examples of inflatable escape slides which are also designed for use as a flotation raft after the slides are detached from the aircraft fuselage.

Referring back to U.S. Pat. No. 3,692,144, it should be recognized that there are inherent difficulties in utilizing an over-the-wing inflatable apparatus, including an inflatable ramp or walkway on the wing and an inflatable escape slide extending therefrom, as an inflatable life raft. Simply detaching the inflatable apparatus from the aircraft fuselage will result in a rather awkward configuration of an inflatable slide and ramp combination which would obviously not function satisfactorily as a life raft. Conversely, the separation of the inflatable slide/raft from the inflatable ramp requires that special provision be made to (1) insure that the slide/raft remains inflated upon separation, and (2) also insure that the inflated ramp remains inflated so that it can be utilized as a walkway or ramp even after detachment of the slide/raft. The present invention is directed towards the solution of these problems.

SUMMARY OF THE INVENTION

The present invention provides a double check valve for use between two separable inflatable units, such as an inflatable ramp and an inflatable slide/raft. The double check valve enables both inflatable units to be inflated from a single gas source at the upstream end of the first inflatable unit (ramp) such that the second inflatable unit (slide/raft) is inflated through the double check valve between the two units. The double check valve will prevent the loss of inflation in either the upstream or downstream inflatable units when the two units are separated from each other.

DESCRIPTION OF THE PREFERRED EMBODIMENTS

Figure 1:
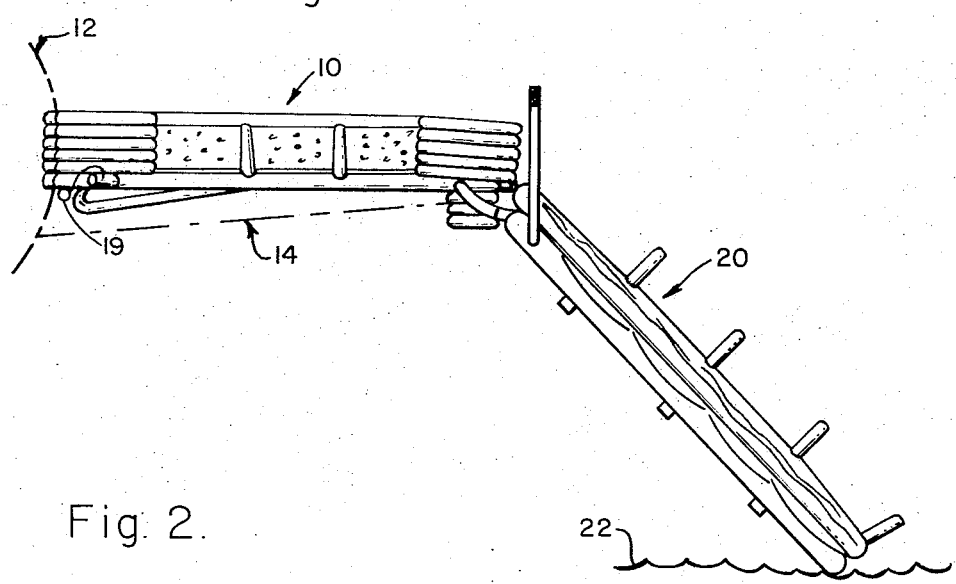
FIG. 1 is a side elevation view of an over-the-wing inflatable apparatus having two separable inflatable units.
Figure 2:
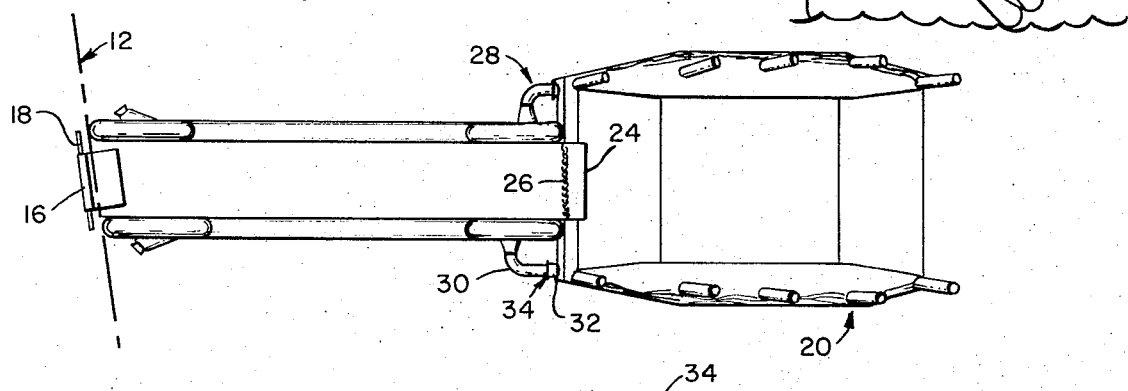
FIG. 2 is a top plan view of the inflatable apparatus of FIG. 1.

FIGS. 1 and 2 illustrate an over-the-wing emergency evacuation system for a passenger aircraft. The system basically comprises an upstream inflatable unit 10 and a downstream inflatable unit 20. The upstream inflatable unit 10 extends outward from the aircraft fuselage 12 over the wing thereof to function as a ramp or walkway on the wing 14. This walkway or ramp 10 may be of any conventional inflatable structure such as disclosed in U.S. Pat. No, 3,692,144 or U.S. Pat. No. 3,476,338.

The upstream or aircraft end of the inflatable ramp 10 is secured to the aircraft fuselage 12 by means of a girt 16 and girt bar 18 disposed in the doorway of the aircraft fuselage 12. An inflation system 19 to inflate the inflatable units is likewise disposed at the upstream end of the ramp 10.

The second inflatable unit 20 such as a slide or slide/-raft is secured to the downstream end of the ramp 10 and extends on an inclined plane to the surface 22. The downstream end of the ramp 10 is secured to a girt 24 at the upper or upstream end of the slide/raft 20. A fabric loop quick disconnect 26 makes this attachment. In addition, at least one inflatable passageway 28 extends between the two inflatable units 10 and 20. As illustrated, a passageway 28 is disposed on either side of the units near the attachment thereof. This passageway 28 is formed between an inflatable tubular extension 30 from the ramp 10 and a similar inflatable tubular extension 32 from the slide/raft 20. A double check valve 34 is disposed in each passageway 28 between the extensions 30 and 32. In operation, the inflatable slide/raft 20 and inflatable ramp 10 are inflated from the same pressure source at the upstream end of the ramp 10, the slide/ramp being inflated through the passageways 28.

As illustrated in FIGS. 3–8, the double check valve 34 generally comprises an upstream check valve 40 and a downstream check valve 42. The upstream check valve 40 includes a tubular check valve housing 44 disposed in the inflatable tubular extension 30 of the ramp 10. A pair of upstream valve flappers 46 are pivotable disposed in the housing 44.

The downstream check valve 42 generally comprises housing 50 disposed in the inflatable tubular extension 32 of the slide/raft 20. A pair of downstream valve flappers 52 are pivotable disposed in this housing 50. Also mounted within the downstream check valve housing 50 is a fork 54 which extends into the upstream check valve housing 44 to hold the upstream check valve flappers 46 in an open position when the double check valve 34 is assembled.

The valve housings 44 and 50 include mating flanges 60 and 62 respectively by which the upstream check valve 40 is secured to the downstream check valve 42 with a quick disconnect coupler 58. An O-ring 64 may be provided between the mating surfaces of the housing flanges 60 and 62 to provide a generally airtight sealing arrangement therebetween.

Figure 3:
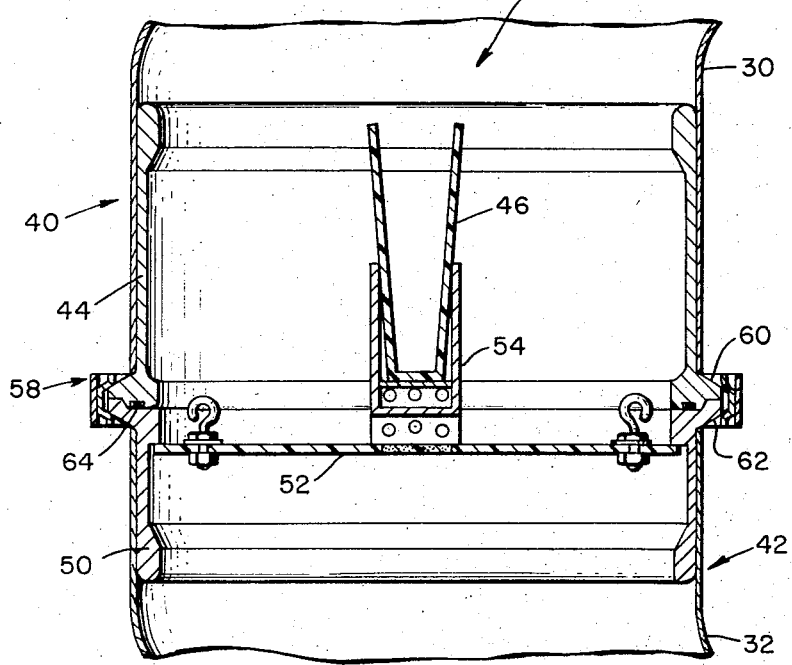
FIG. 3 is a sectional view of the assembled double check valve of the present invention for use between the two separable inflatable units of FIG. 1.
Figure 4:
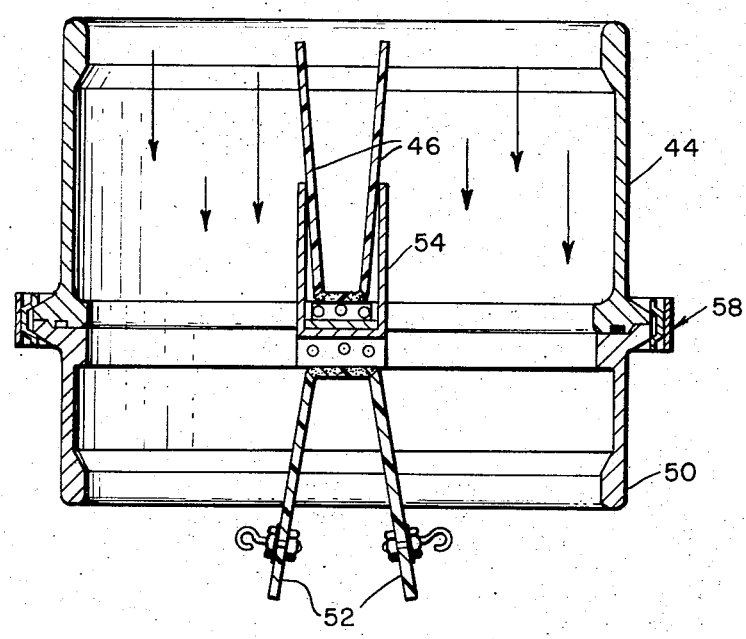
FIG. 4 is a sectional view of the double check valve of the FIG. 3 shown during inflation of the inflatable units.

FIG. 3 represents the assembled check valves prior to inflation of the two inflatable units. Upon initiation of the inflation the gas pressure will build up in the upper inflatable unit until sufficient pressure is generated to open the downstream check valve flappers 52. Once sufficient gas pressure has been built up, the downstream valve flappers 52 will be forced to their open position permitting gas pressure to flow into and inflate the downstream inflatable unit 20, namely, the slide/raft. FIG. 4 illustrates the double check valve during this stage of inflation. Once the inflation of the two inflatable units has been completed, the pressure in both units will tend to become equalized.

Figure 8:
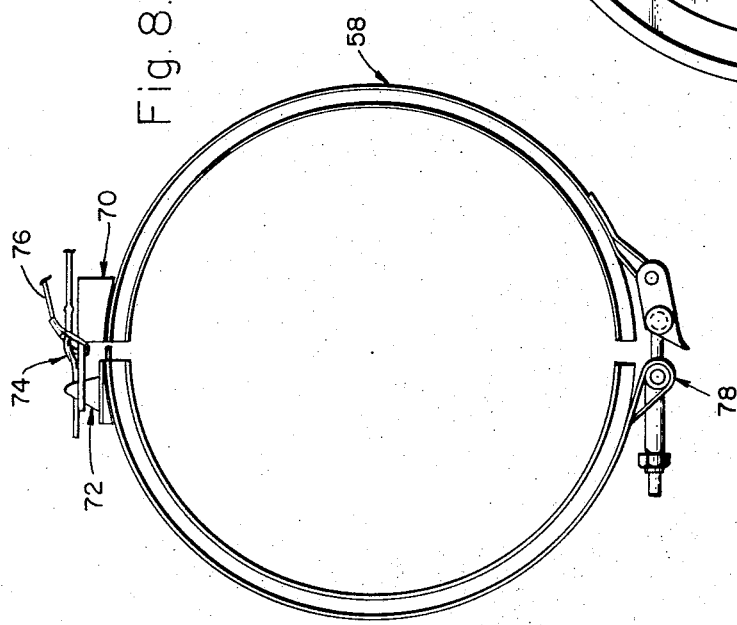
FIG. 8 is a view of the quick disconnect assembly securing the upstream check valve to the downstream check valve.

As shown most clearly in FIG. 8, the quick disconnect coupler 58 is provided with a latch half 70 and a cone half 72 which can be quickly separated by means of a cable assembly 74 having a pull handle 76 thereon. Tensioning or tightening of the quick disconnect coupler 58 is provided by the tensioning mechanism 78 disclosed opposite the latch and core halves 70 and 72.

Figure 5:
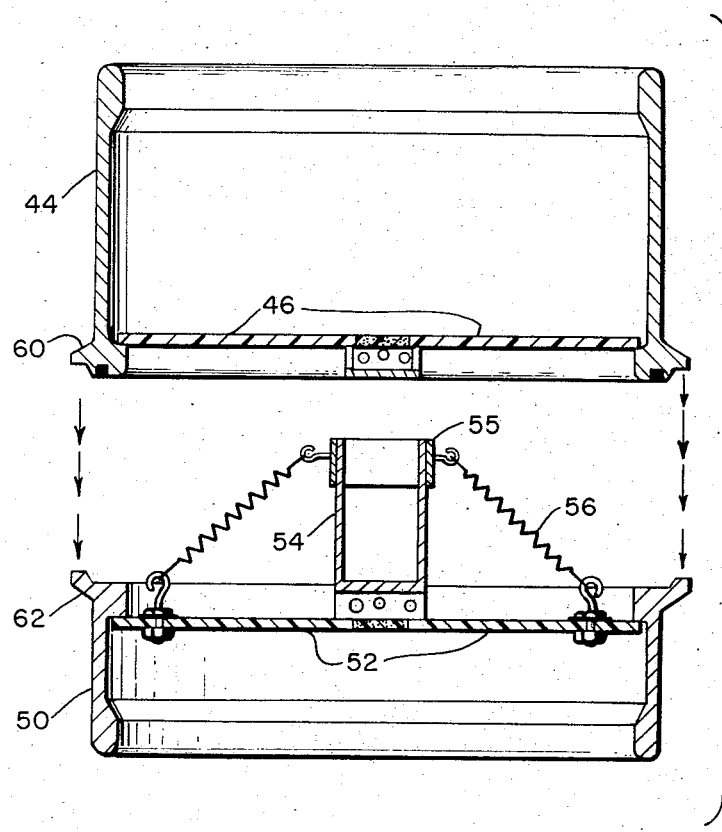
FIG. 5 is a sectional view of the double check valve of FIGS. 3 and 4 following separation of the downstream inflatable unit from the upstream inflatable unit.
Figure 6:
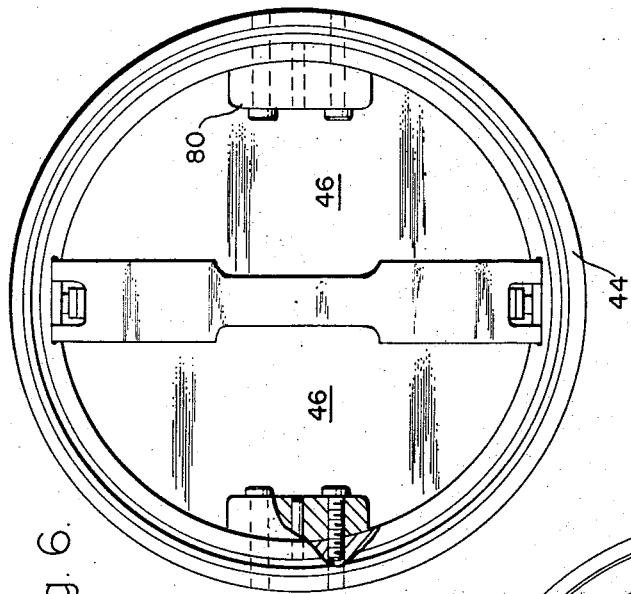
FIG. 6 is a plan view of the separated upstream check valve of the double check valve of FIG. 5.
Figure 7:
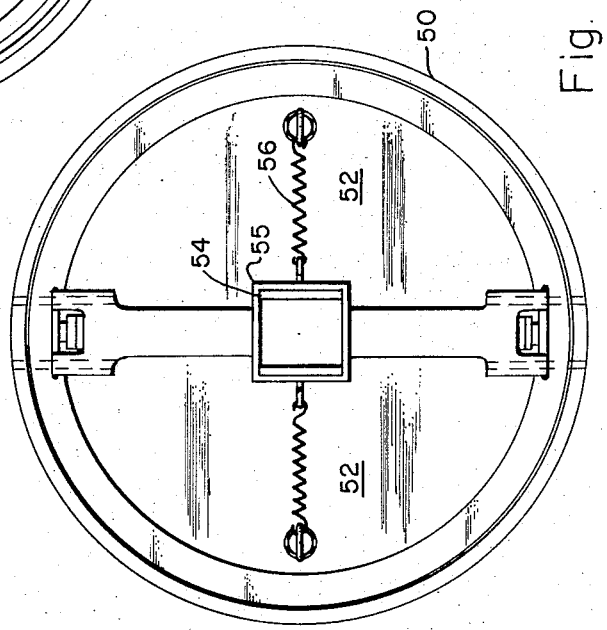
FIG. 7 is a plan view of the separated downstream check valve of the double check valve of FIG. 5.

When it becomes desirable to separate the downstream inflatable unit 20 from the upstream inflatable unit 10, the handle 76 of the quick disconnect coupler 58 is pulled to remove the quick disconnect coupler 58 from around the valve flanges 60 and 62. The gas pressure in the upstream inflatable unit will quickly force the downstream inflatable unit away from the upstream inflatable unit and the fork 54 of the downstream valve 42 will move away from the upstream valve 40 enabling the upstream valve flappers 46 to move to their closed position. Concurrently, the fabric loop quick disconnect 26 is pulled to release the downstream unit girt 24 from the upstream unit 10. FIG. 5 illustrates the downstream check valve 42 separated from the upstream check valve 40 with their respective flappers in a closed position. FIGS. 6 and 7 illustrate plan views of the separated upstream and downstream check valves respectively. As shown in FIG. 6, flapper stops 80 may be utilized to control the outward movement of the flappers. In addition, a restraint cap 55 may be placed over the fork 54 of the downstream check valve and biasing means such as springs 56 extended between the cap 55 and the flappers 52 to maintain the flappers 52 in a closed position against possible wave action.

As can be seen from the above, the present invention provides a double check valve which permits two separably inflatable units to be pressurized from a single inflation source yet permits the two inflatable units to be separated while insuring that both units remain inflated following separation.

While specific embodiments of the invention have been illustrated and described, it is to be understood that these embodiments are provided by way of example only and that the invention is not to be construed as being limited thereto, but only by the proper scope of the following claims.

What we claim is:

1. In combination:
a first inflatable unit;
a second inflatable unit in fluid communication with said first inflatable unit;
means operably associated with said first inflatable unit to inflate said first and second inflatable units, said second inflatable unit inflated through the fluid communication from said first inflatable unit;
first check valve means operably associated with said first inflatable unit in the fluid communication with said second inflatable unit;
second check valve means operably associated with said second inflatable unit in the fluid communication with said first inflatable unit;
means to operably connect said first and second check valve means in the fluid communication between said first and second inflatable units, said second check valve means including means to maintain said first check valve means in an open position; and
means to quickly disconnect said second check valve means from said first check valve means and disconnect the fluid communication between said first and second inflatable units, said first check valve means maintaining inflation of said first inflatable unit and said second check valve means maintaining inflation of said second inflatable unit.

2. In combination:
a first inflatable unit comprising an inflatable ramp disposed on an elevated egress;
a second inflatable unit in fluid communication with said first inflatable unit, said second inflatable unit comprising an inflatable evacuation slide and raft extending from the elevated egress to a surface below the egress;
means operably associated with said first inflatable unit to inflate said first and second inflatable units said second inflatable unit inflated through the fluid communication from said first inflatable unit;
first check valve means operably associated with said first inflatable unit in the fluid communication with said second inflatable unit;
second check valve means operably associated with said second inflatable unit in the fluid communication with said first inflatable unit;
means to operably connect said first and second check valve means in the fluid communication between said first and second inflatable units, said second check valve means including means to maintain said first check valve means in an open position; and
means to quickly disconnect said second check valve means from said first check valve means and disconnect the fluid communication between said first and second inflatable units, said first check valve means maintaining inflation of said first inflatable unit and said second check valve means maintaining inflation of said second inflatable unit.

3. In combination:
a first inflatable unit;
a second inflatable unit in fluid communication with said first inflatable unit;
means operably associated with said first inflatable unit to inflate said first and second inflatable units, said second inflatable unit inflated through the fluid communication from said first inflatable unit;

first check valve means operably associated with said first inflatable unit in the fluid communication with said second inflatable unit, said first check valve means comprising a generally cyclindrical housing, a flapper valve seat and a pair of flappers pivotably disposed in said housing to contact the valve seat in a closed position and pivot inwardly in an open position;

second check valve means operably associated with said second inflatable unit in the fluid communication with said first inflatable unit, said second check valve means comprising a generally cylindrical housing including a flapper valve seat, a pair of flappers pivotably disposed in said housing to contact the valve seat in a closed position and pivot inwardly in an open position;

means to operably connect said first and second check valve means in the fluid communication between said first and second inflatable units, said second check valve means including a fork extending outward from the pivot of the second check valve flappers to hold the first check valve flappers away from the first check valve seat to maintain said first check valve means in an open position; and means to quickly disconnect said second check valve means from said first check valve means and disconnect the fluid communication between said first and second inflatable units, said first check valve means maintaining inflation of said first inflatable unit and said second check valve means maintaining inflation of said second inflatable unit.

4. The combination of claim 3 and, in addition, biasing means disposed between the fork and the second check valve flappers to bias the second check valve flappers towards the valve seat when said second check valve means is disconnected from said first check valve means.

5. The combination of claim 4 wherein said first check valve housing includes a shaped flange, said second check valve housing includes a shaped flange mating to the shaped flange of said first check valve housing, and said means to operably connect said first and second check valve means is a quick disconnect coupler.

6. The combination of claim 5 wherein said quick disconnect coupler includes a core half, a latch half, and a pull cable assembly operably associated therewith.

7. A double check valve disposed between an inflatable ramp disposed at an elevated egress and a separable inflatable evacuation slide and raft in fluid communication therewith extending from the inflatable ramp to a surface below the elevated egress, comprising:
a first check valve operably associated with said inflatable ramp;
a second check valve operably associated with said inflatable evacuation slide and raft;
means to operably connect said first check valve to said second check valve, said second check valve including means to maintain said first check valve in an open position when said first and second check valves are operably connected; and
means to quickly disconnect said first check valve from said second valve when the inflatable slide and raft is separated from the inflatable ramp.

8. The combination of claim 7 wherein said first check valve means comprise a generally cylindrical housing, a flapper valve seat and a pair of flappers pivotably disposed in said housing to contact the valve seat in a closed position and pivot inwardly in an open position, and said second check valve means comprise a generally cylindrical housing including a flapper valve seat, a pair of flappers pivotably disposed in said housing to contact the valve seat in a closed position and pivot inwardly in an open position, and a fork extending outward from the pivot of the second check valve flappers to hold the first check valve flappers away from the first check valve seat.

9. The combination of claim 8 and, in addition, biasing means disposed between the fork and the second check valve flappers to bias the second check valve flappers towards the valve seat when second check valve means is disconnected from said first check valve means.

10. The combination of claim 9 wherein said first check valve housing includes a shaped flange, said second check valve housing includes a shaped flange mating to the shaped flange of said first check valve housing, and said means to operably connect said first and second check valve means is a quick disconnect coupler.

11. A double check valve disposed between an inflatable ramp disposed at an elevated egress and a separable inflatable evacuation slide and raft in fluid communication therewith extending from the inflatable ramp to a surface below the elevated egress, comprising:
means operably associated with said inflatable ramp to inflate said ramp and said slide and raft, said slide and raft inflated through the fluid communication from said ramp;
first check valve means operably associated with said ramp in the fluid communication with said slide and raft;
second check valve means operably associated with said slide and raft in the fluid communication with said ramp;
means to operably connect said first and second check valve means in the fluid communication between said ramp and said slide and raft, said second check valve means including means to maintain said first check vlave means in an open position; and
means to quickly disconnect said second check valve means from said first check valve means and disconnect the fluid communication between said ramp and said slide and raft, said first check valve means maintaining inflation of said ramp and said second check valve means maintaining inflation of said slide and raft.

12. The combination of claim 11 wherein said first check valve means comprise a generally cylindrical housing, a flapper valve seat and a pair of flappers pivotably disposed in said housing to contact the valve seat in a closed position and pivot inwardly in an open position, and said second check valve means comprise a generally cylindrical housing including a flapper valve seat, a pair of flappers pivotably disposed in said housing to contact the valve seat in a closed position and pivot inwardly in an open position, and a fork extending outward from the pivot of the second check valve flappers to hold the first check valve flappers away from the first check valve seat.

13. The combination of claim 12 and, in addition, biasing means disposed between the fork and the second check valve flappers to bias the second check valve flappers towards the valve seat when said second check valve means is disconnected from said check valve means.

14. The combination of claim 13 wherein said first check valve housing includes a shaped flange, said second check valve housing includes a shaped flange mating to the shaped flange of said first check valve housing, and said means to operably connect said first and second check valve means is a quick disconnect coupler.

* * * * *

UNITED STATES PATENT OFFICE
CERTIFICATE OF CORRECTION

PATENT NO. : 3,866,734
DATED : Feb. 18, 1975
INVENTOR(S) : Paul A. Elkins and Ralph A. Miller It is certified that error appears in the above-identified patent and that said Letters Patent are hereby corrected as shown below:

Claim 2, line 10, after "units" insert --,--

Claim 9, line 4, after "when" insert --said--

Claim 11, line 20, change "vlave" to --valve--

Signed and sealed this 13th day of May 1975.

(SEAL)
Attest:

RUTH C. MASON
Attesting Officer

C. MARSHALL DANN
Commissioner of Patents
and Trademarks